United States Patent
Nelson

(10) Patent No.: US 7,528,722 B2
(45) Date of Patent: May 5, 2009

(54) SYSTEM AND METHOD FOR NOTIFYING A PACKAGE RECIPIENT OF PACKAGE ARRIVAL

(76) Inventor: David G. Nelson, 2351 N. Masters La., Round Lake Beach, IL (US) 60073

( * ) Notice: Subject to any disclaimer, the term of this patent is extended or adjusted under 35 U.S.C. 154(b) by 352 days.

(21) Appl. No.: 11/515,559

(22) Filed: Sep. 5, 2006

(65) Prior Publication Data

US 2008/0061966 A1  Mar. 13, 2008

(51) Int. Cl.
  G08B 13/14    (2006.01)
  G08B 1/08     (2006.01)
  G08B 21/00    (2006.01)
(52) U.S. Cl. .............................. 340/572.1; 340/539.17; 340/568.1; 340/686.6
(58) Field of Classification Search ... 340/568.1–572.9, 340/573, 539.1, 539.11, 539.13, 539.18, 340/539.2, 539.23, 539.32, 686.1, 673; 700/214, 700/217, 225, 226, 228; 705/401, 406
See application file for complete search history.

(56) References Cited

U.S. PATENT DOCUMENTS

| | | | |
|---|---|---|---|
| 3,826,900 A | 7/1974 | Moellering | |
| 4,713,661 A * | 12/1987 | Boone et al. | 340/994 |
| 4,727,368 A | 2/1988 | Larson et al. | |
| 5,260,694 A * | 11/1993 | Remahl | 340/674 |
| 5,627,517 A * | 5/1997 | Theimer et al. | 340/572.1 |
| 6,356,196 B1 * | 3/2002 | Wong et al. | 340/571 |
| 6,404,337 B1 | 6/2002 | Van Till et al. | |
| 6,624,752 B2 * | 9/2003 | Klitsgaard et al. | 340/572.1 |
| 6,634,551 B2 | 10/2003 | Barta et al. | |
| 6,724,306 B1 * | 4/2004 | Parsley, Jr. et al. | 340/568.1 |
| 6,764,012 B2 | 7/2004 | Connolly et al. | |
| 6,831,558 B1 * | 12/2004 | Andrew | 340/539.2 |
| 6,967,575 B1 | 11/2005 | Dohrmann et al. | |
| 6,994,253 B2 | 2/2006 | Miller et al. | |
| 7,030,760 B1 * | 4/2006 | Brown | 340/568.1 |
| 7,119,716 B2 * | 10/2006 | Horstemeyer | 340/994 |
| 2002/0054370 A1 | 5/2002 | Hara | |
| 2002/0138173 A1 | 9/2002 | Barta et al. | |
| 2003/0093180 A1 | 5/2003 | Stevens | |
| 2003/0110170 A1 | 6/2003 | Matsuoka | |
| 2003/0231112 A1 | 12/2003 | Raju | |
| 2004/0084519 A1 | 5/2004 | Barta et al. | |

(Continued)

OTHER PUBLICATIONS

US 5,979,368, 11/1999, Kindell (withdrawn)

*Primary Examiner*—Toan N Pham
*Assistant Examiner*—Jennifer Mehmood
(74) *Attorney, Agent, or Firm*—Meroni & Meroni, P.C.; Charles F. Meroni, Jr.; Christopher J. Scott

(57) ABSTRACT

A package delivery notification system and method notifies package recipients of a package's arrival. The method-enabling system comprises a package, a package recipient, a package carrier, first and second wireless communications devices, and a recipient setting. The package carrier brings the package and the first wireless communications device to within a delivery distance relative to the recipient setting. The first wireless communications device and the delivery distance enable data transmission to the second wireless communications device located at the recipient setting. The package carrier transmits a package-delivery message to the second communications device, which device receives and displays the package-delivery message for notifying the package recipient of the package's arrival.

20 Claims, 7 Drawing Sheets

U.S. PATENT DOCUMENTS

| | | |
|---|---|---|
| 2004/0094615 A1 | 5/2004 | Sansone et al. |
| 2004/0143354 A1 | 7/2004 | Kato et al. |
| 2004/0149824 A1 | 8/2004 | Miller et al. |
| 2004/0181570 A1 | 9/2004 | Kaneko |
| 2006/0026047 A1* | 2/2006 | Jones .......................... 705/7 |

* cited by examiner

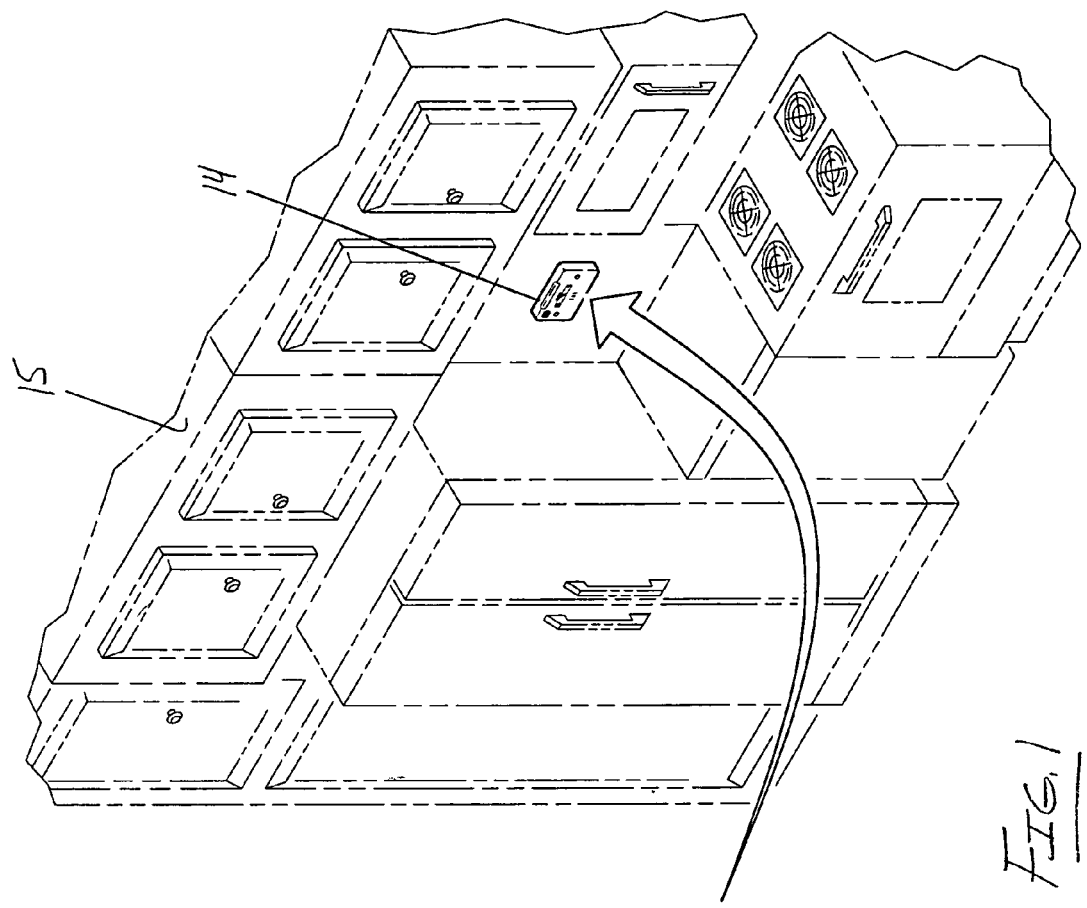
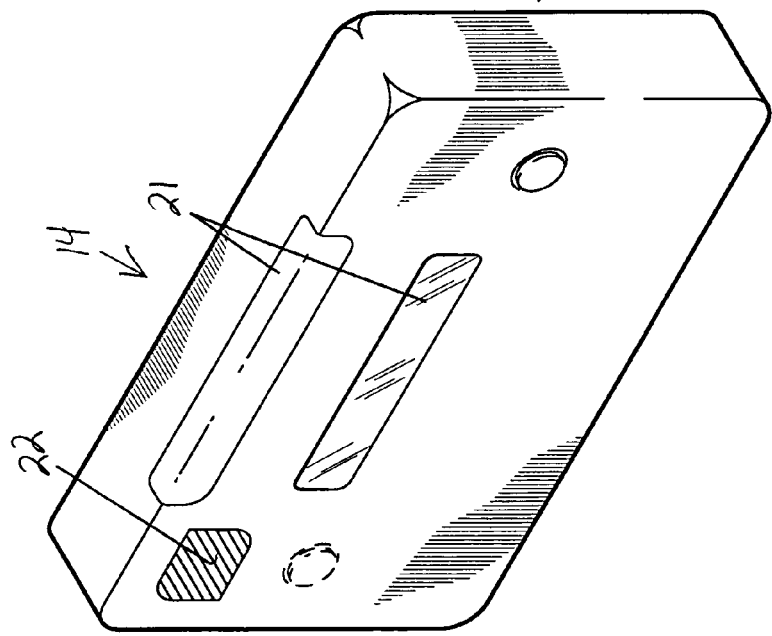
FIG. 1

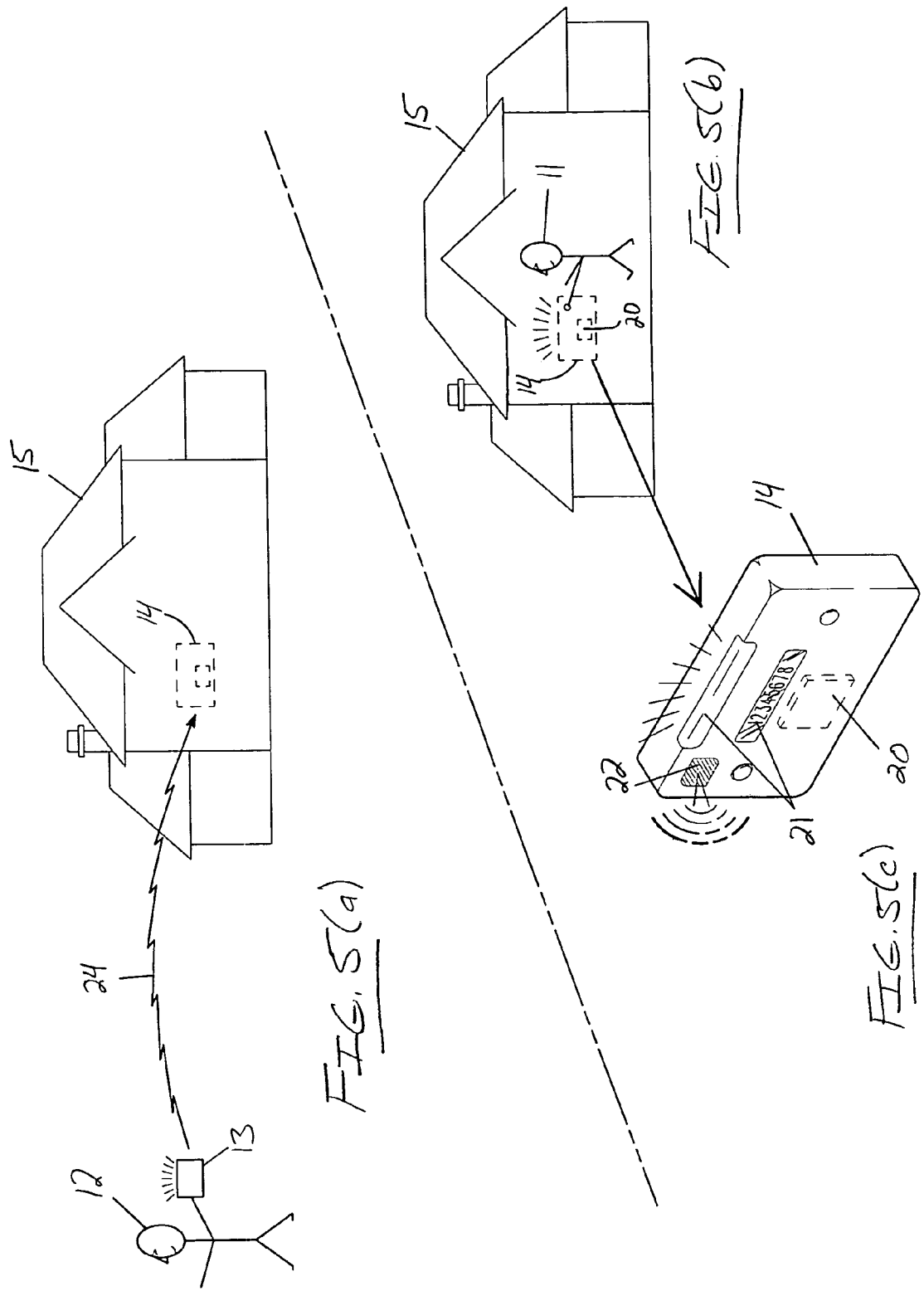

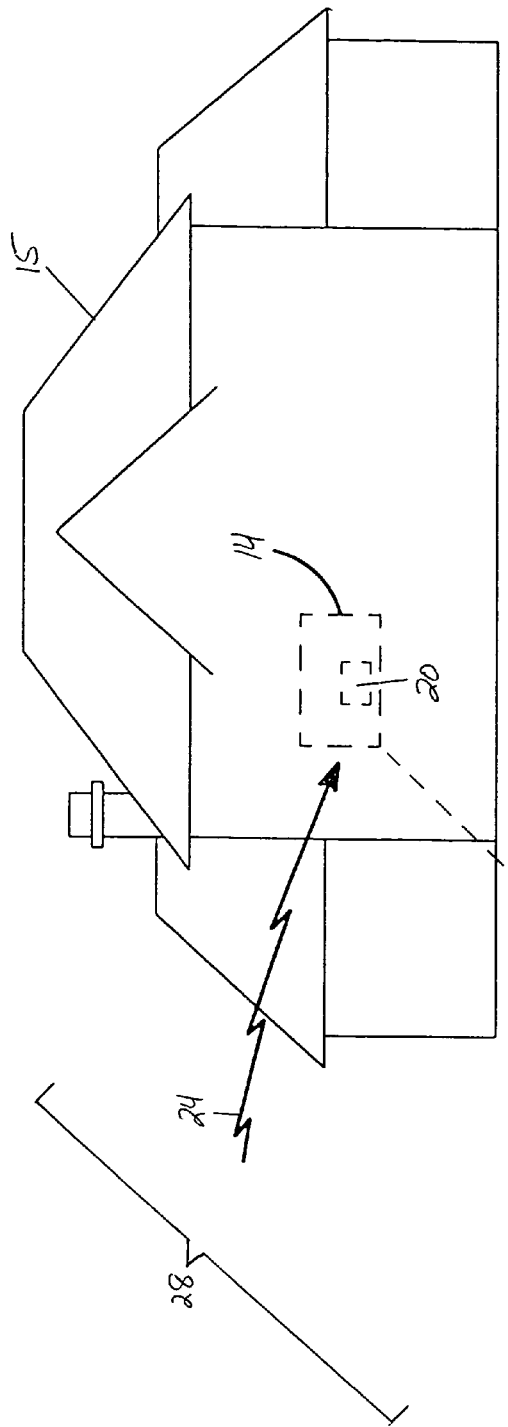
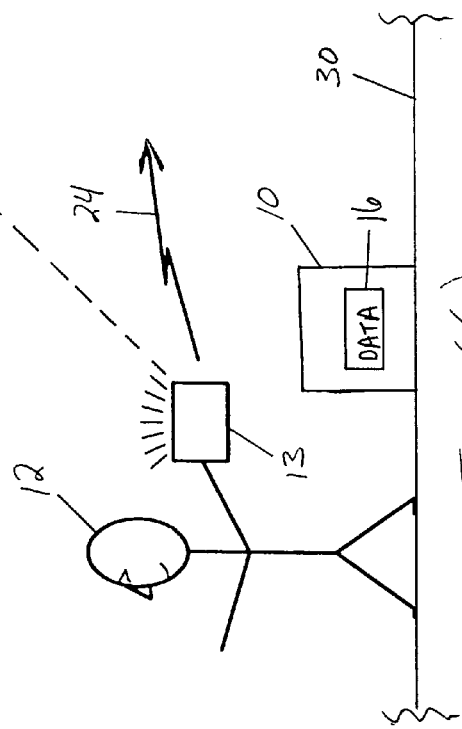
FIG. 6(b)
FIG. 6(a)

SYSTEM AND METHOD FOR NOTIFYING A PACKAGE RECIPIENT OF PACKAGE ARRIVAL

BACKGROUND OF THE INVENTION

1. Field of the Invention

The claimed invention generally relates to a method-enabling device or system of devices for notifying a package recipient of a package's arrival. More particularly, the present invention relates to a system and method for notifying a package recipient of a package's arrival as enabled by close-range radio frequency transmissions intermediate a mobile package carrier and a stationary package destination.

2. Description of the Prior Art

Personal Digital Assistants (PDA's) are handheld devices that were originally designed as personal organizers, but became much more versatile over the years. The many uses and tasks of a basic PDA include use as a calculator, use as a clock, use as a calendar, use as a gaming device, use for accessing the Internet, use for sending and receiving electronic mail or e-mail, use as a radio or stereo, use as a video recorder, use for recording notes, use as an address book, and use as a spreadsheet. Current state of the art PDA's also have both color screens and audio capabilities, enabling them to be used as mobile phones (PDA Phone), web browsers or media players. Many PDA's can access the Internet, intranets or extranets via Wi-Fi, or Wireless Wide-Area Networks (WWAN's).

A personal area network (PAN) is a computer network used for communication among computer devices (including telephones and personal digital assistants) close to one person, the reach or radius of which is typically on the order of a few meters. Personal area networks can be used for communication among the personal devices themselves (intrapersonal communication), or for connecting to a higher level network and the Internet (an uplink). Personal area networks may be wired with computer buses such as USB and FireWire. A wireless personal area network (WPAN) can also be made possible with network technologies such as IrDA and Bluetooth.

Notably, Bluetooth is an industrial specification for wireless personal area networks (PAN's), also known as IEEE 802.15.1. Bluetooth provides a way to connect and exchange information between devices like personal digital assistants (PDA's), mobile phones, laptops, personal computers (PC's), printers, digital cameras and video game consoles such as the Wii via a secure, globally unlicensed short range radio frequency. When installed in a plurality of wireless communications devices, such as personal digital assistants and the like, it is conceivable that Bluetooth may enable users thereof to foster package delivery notification. Bearing this notion in mind, it is noted that the prior art relating to systems and methods for notifying package recipients of a package's arrival is somewhat well developed. In this regard, certain prior art patents relating to methods and systems for notifying package recipients and the like of a package's arrival are briefly described hereinafter.

U.S. Pat. No. 6,356,196 ('196 patent), for example, which issued to Wong et al., discloses a Verified Receipt, Notification, and Theft Deterrence of Courier-Delivered Parcels. The '196 patent teaches an alarm unit and a separate alert unit. The Alarm Unit is securely affixed to the parcel before the parcel is left at the delivery site, and the Alert Unit is placed at a secure site that is within radio range of the delivery site. The Alarm Unit is armed by the deliveryman upon depositing the parcel at the delivery site, and arming of the Alarm Unit results in the transmission of messages verifying to the seller or delivery agent that delivery has taken place and notifying the purchaser or intended recipient that the parcel has arrived. Movement of the parcel after it has been deposited at the delivery site and has been armed results in messages being transmitted to the shipping agent and to the intended recipient announcing that the parcel has been stolen. Such unauthorized movement of the parcel also activates a very loud audible alarm affixed to the parcel and activates a tracking beacon in or on the parcel, permitting the whereabouts of the parcel to be determined or tracked. The intended recipient of the parcel, after being notified of its delivery can disarm the Alarm Unit by inserting a secret number into a keypad on the Alarm Unit and then pressing a disarm button. Upon being disarmed, the Alarm Unit generates a signal that causes the Alert Unit to notify the seller and the delivery agent that an authorized person has taken possession of the parcel, thereby verifying receipt.

U.S. Pat. No. 6,404,337 ('337 patent), which issued to Van Till et al., discloses a System and Method for Providing Access to Unattended Storage. The '337 patent teaches a system comprising a first transmitter for placing an order for an item with a merchant; a second transmitter for transmitting a request for a pick-up of the item; a tracking information generator for generating tracking information in response to a request for a pick-up of the item; a transceiver for receiving and transmitting the tracking information; a memory for storing the tracking information; a third transmitter for transmitting the tracking information to a storage device a comparator for comparing the tracking information transmitted to the storage device to the tracking information stored in the memory; and a digital signature generator for creating a digital signature. In another embodiment of the present invention, a method of providing remote access to a storage device is described. The method includes the steps of transmitting tracking information to a storage device; and gaining access to an interior of the storage device if the tracking information transmitted to the storage device matches tracking information stored in a memory.

U.S. Pat. No. 6,634,551 ('551 patent), which issued to Barta et al., discloses a Delivery Notice and Method of Using Same. The '551 patent teaches a single unique delivery notice for leaving behind at a particular location. However, just before it is left, this notice is electronically "linked" to the parcel(s) which were undeliverable. This can be done by a handheld portable data acquisition device which includes a conventional scanning means, allowing information to be scanned from the delivery notice as well as labels on the parcels, and stored on the handheld portable data acquisition device. If ten parcels were undeliverable, only one delivery notice is left behind but is electronically "linked" to all ten packages. The intended recipient can then contact the delivery service via the internet (or other suitable network) or by phone, by using information provided on the delivery notice. By providing the delivery service with unique information from the delivery notice, the intended recipient can get valuable information regarding the undelivered parcels. Such information can include shipper name, how many packages from each shipper, time of attempted delivery, COD status, etc. Arrangements can then be made to have the package(s) redelivered, held at a local operation center, redirected, or returned.

U.S. Pat. No. 6,764,012 ('012 patent), which issued to Connolly et al., discloses a Signaling Arrangement for and Method of Signaling in a Wireless Local Area Network. The '012 patent teaches a signaling arrangement and method for use in a wireless local area network as managed by a system manager and includes a reader for electro-optically reading bar code symbols. The system manager verifies that a symbol has been successfully read and sends an acknowledgment signal by wireless, radio frequency transmission to a remote indicator operative for generating an alert signal noticeable to a user.

U.S. Pat. No. 6,967,575 ('575 patent), which issued to Dohrmann et al., discloses certain Methods and Apparatus for Unattended Pickups and Deliveries. The '575 patent teaches a secure pickup and delivery container comprising a lockable door, a control unit, an access element, and an anchoring element, according to one embodiment. The control unit includes a processing element and a memory that can be programmed either on-site or remotely with access privilege information such as identity (e.g. of container, delivery person, etc.), location, date, time, frequency of access, and/or package-specific information. In one embodiment, access privilege information is programmed when an intended recipient of a delivery consummates a point of sale transaction, for example over the Internet or telephone. The access element can be a keypad, a biometric scanner, a card reader, a bar-code reader, and/or a wireless control element to read a programmable token such as a smart card. Delivery personnel can enter access request information into the access element, and if it favorably compares with the access privilege information, the control unit unlocks the door. Notification can be concurrently made via wireline or wireless communications to the intended recipient, who may be situated remote from the secure container. The recipient can optionally return a delivery acknowledgment to the delivery personnel. Details of the delivery transaction can also be recorded electronically on the delivery personnel's token, within the container, or at a remote location.

United States Patent Application Publication No. 2002/0054370, which was authored by Hara, describes a user notification system used for a home delivery locker which a home delivery locker and a managing center for managing the home delivery locker are connected through a communication line, and information indicating that the home delivery locker has a parcel is received by the managing center, the system is characterized in that, based upon information of the receiver contained in the information, the managing center or the home delivery locker automatically delivers the parcel delivery information to the receiver through communication means such as telephone (including mobile telephone), facsimile and electronic mail. In the case of a conventional pick-up process of a parcel, it is not possible to confirm whether or not any parcel has arrived, until the receiver has come home and see a notice inside the mail post; therefore, the resulting problem is that, in the case of any urgent parcel, the receiver has to go to the mail box many times to see whether there is any notice therein.

United States Patent Application Publication No. 2003/0231112, which was authored by Raju, describes a customized mailbox is provided to customers for placement outside their home. Simple electronics, such as a display, keypad, bar-code reader, and transmitter/receiver may be contained within the mailbox. When parcel delivery is attempted, the delivery person may facilitate the notification of the user by, for example, scanning a bar code on the parcel with the bar code reader. Parcel information is then wirelessly forwarded to a service provider. The service provider may forward parcel information a mobile device or other notification mechanism as specified in user preferences. Upon receipt of the parcel delivery information, the user may, through the mobile device or other notification mechanism, approve delivery of the parcel. The service provider may then forward this approval to the electronic mailbox, where an electronic lock may be opened and the delivery person may place the parcel in the electronic mailbox.

United States Patent Application Publication No. 2003/0110170, which was authored by Matsuoka, discloses a delivery noticing system which can give a previous notice of delivery to a receiver, without notifying a delivery company of the receiver's communication address. A receiver is stored in advance in a provider database in relation to a provider used by the receiver. A central apparatus 1 accepts information related to the delivery of the receiver, retrieves the provider used by the receiver from provider database, and generates delivery noticing information based on the information related to the delivery. The central apparatus 1 transmits the generated delivery noticing information with information on the receiver to a server computer 2 of the retrieved provider. The server computer 2 retrieves a communication address from address database based on the transmitted information on the receiver, and transmits the transmitted delivery noticing information to the retrieved communication address.

United States Patent Application Publication No. 2004/0094615, which was authored by Sansone et al., describes a method that enables a receiver or receiver's agent to obtain notification of the letters, flats and/or packages that the recipient is going to receive prior to the delivery of the mail. The recipient is then able to inform a post or courier, e.g., Federal Express®, Airborne,® United Parcel Service®, DHL®, etc., of the manner in which the recipient would like the mail delivered. The post and courier, hereinafter, will be referred to as "carrier". For instance, the recipient may want the mail physically redirected to the recipient's temporary address, or physically delivered to the recipient's agent, or physically delivered to the recipient's attorney, or physically returned to the mailer.

United States Patent Application Publication No. 2004/0149822, which was authored by Stevens et al., discloses a delivery system includes a drop box including a first transceiver, and an electronic tag associated with a package and comprising a second transceiver. The first and second transceivers wirelessly communicate with each other in order to access the drop box.

United States Patent Application Publication No. 2006/0026047, which issued to Jones, discloses a package delivery notification system reports impending package deliveries and precisely notifies recipients of when to expect the deliveries. The package delivery notification system utilizes memory, a communications device, and a system manager. Package data identifying a package that is to be delivered to a recipient is stored in the memory. The package data indicates that the recipient is to receive the package and indicates the expected time that the package is to be delivered. When the package is assigned to a vehicle that will deliver the package to a premises of the recipient, the system manager transmits, via the communications device, a notification message to the recipient. The notification message preferably indicates the approximate time that the package is expected to arrive.

It will be seen from an inspection of the foregoing United States patent disclosures that the prior art does not disclose or otherwise teach a Bluetooth-enabled package delivery notification system. The prior art thus perceives a need for a wireless communication method for notifying package recipients of package arrival, as preferably enabled by relatively inexpensive, convenient, and easy-to-use Bluetooth methodology.

SUMMARY OF THE INVENTION

Accordingly, it is an object of the present invention to address the need for Bluetooth-enabled package notification methodology. As a means to provide an answer for the noted needs as well as other readily observable needs that will become apparent after reading this specification and viewing the appended drawings, the claimed invention provides a method-enabling package notification system comprising a variety of cooperative components including a package, a package recipient, a package carrier, first and second wireless communications devices, and a fixed recipient setting. The package is cooperatively associated with certain package-associable data, such as delivery address, recipient name, recipient telephone number, courier name, courier company information, date and time of delivery, and other courier contact information.

It is contemplated that the package-associable data may well function to direct the package carrier to the recipient setting, and also serve as a foundation for providing the package recipient with certain package delivery information. As the package carrier brings, carries, or delivers the package (coupled with the first wireless communications device) to within a certain preferred delivery distance relative to the recipient setting, certain lines of communication are enabled intermediate the first and second wireless communications devices. In this regard, the first wireless communications device comprises certain data-inputting means, such as a key pad, a microphone, or certain other state of the art inputting means such as scanning hardware and software. Further, the first wireless communications device preferably comprises certain data-transmitting means as enabled by Bluetooth technology along with a driving first power source.

The second wireless communications device is preferably located at the recipient setting, which setting may be a residence, place of business or similar other premises. The second wireless communications device preferably comprises certain data-receiving means, as may be defined in part by Bluetooth technology, certain data-outputting means, such as a signaling light, speaker, or message display screen, all as driven by a second power source. As prefatorily stated, the delivery distance enables communication intermediate the first and second wireless communications devices. In this regard, it is contemplated that the package carrier may transmit a package-delivery message to the second communications device via the data-inputting means and data-transmitting means. Thereafter, the data-receiving means receive the package-delivery message, and the data-outputting means provide the package recipient with the package delivery message. The package delivery notification system and method of the present invention may thus function to effectively notify a package recipient of a package's arrival.

BRIEF DESCRIPTION OF THE DRAWINGS

Other features of my invention will become more evident from a consideration of the following brief description of patent drawings:

FIG. 1 is a fragmentary diagrammatic perspective type depiction of a wireless communications device being installed at a package recipient setting.

FIG. 5(a) is a diagrammatic depiction of a package carrier transmitting data via a first wireless communications device to a second wireless communications device located within a recipient setting.

FIG. 5(b) is a diagrammatic depiction of a package recipient being notified of a package's arrival via the second wireless communications device shown in FIG. 5(a)

FIG. 5(c) is an enlarged depiction of the second wireless communications device shown in FIG. 5(b).

FIG. 6(a) is an enlarged fragmentary depiction of a package carrier simultaneously carrying a first wireless communications device and a package, the package being illustrated adjacent the carrier's person.

FIG. 6(b) is an enlarged depiction of the second wireless communications device and recipient setting shown in FIG. 5(a).

DETAILED DESCRIPTION OF THE PREFERRED SYSTEM AND METHODOLOGY

Figure 2:
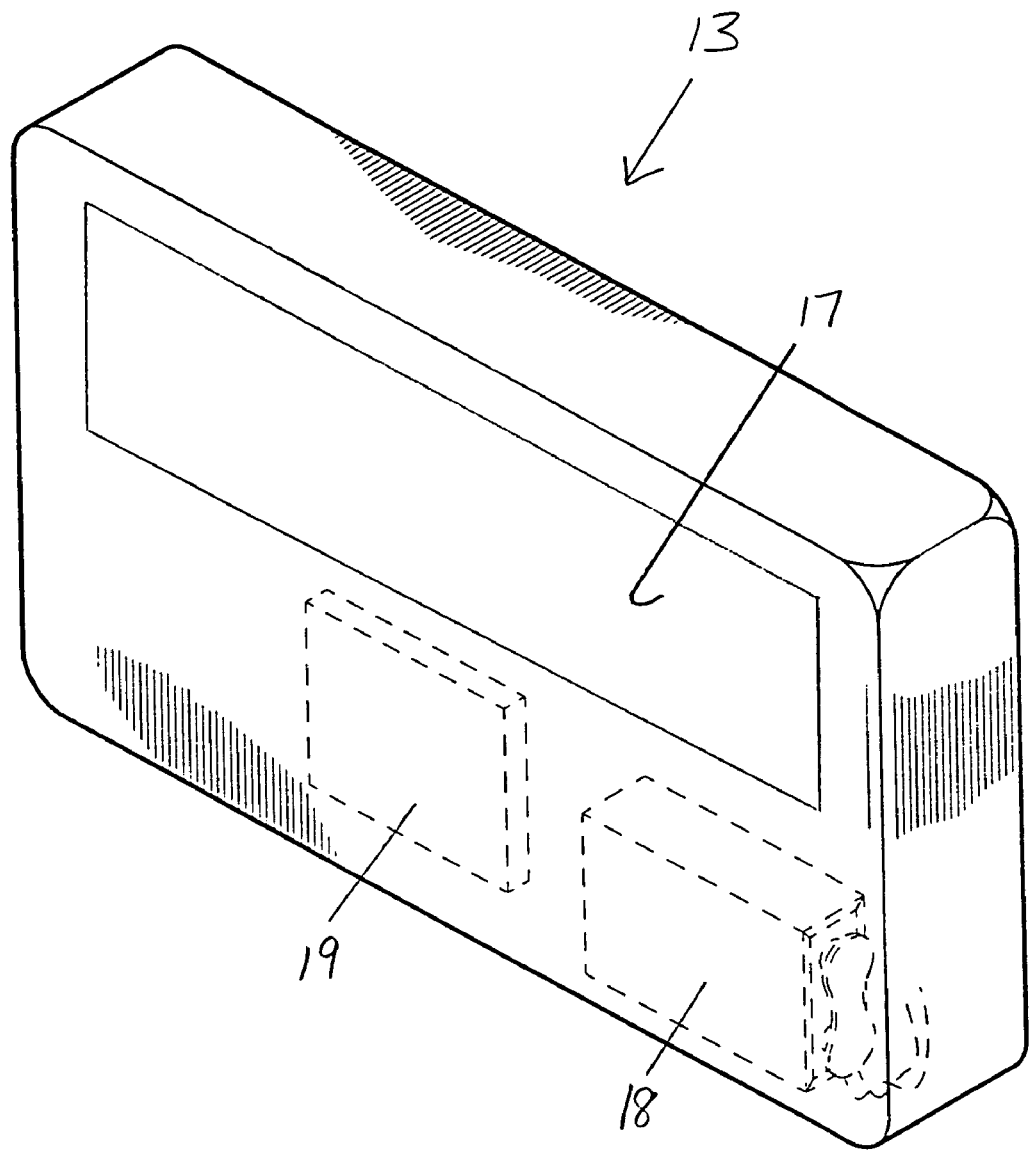
FIG. 2 is a front perspective view of a transmitting wireless communications device of the present invention depicting a generic input pad for inputting data, a Bluetooth chip, and a power source.
Figure 3:
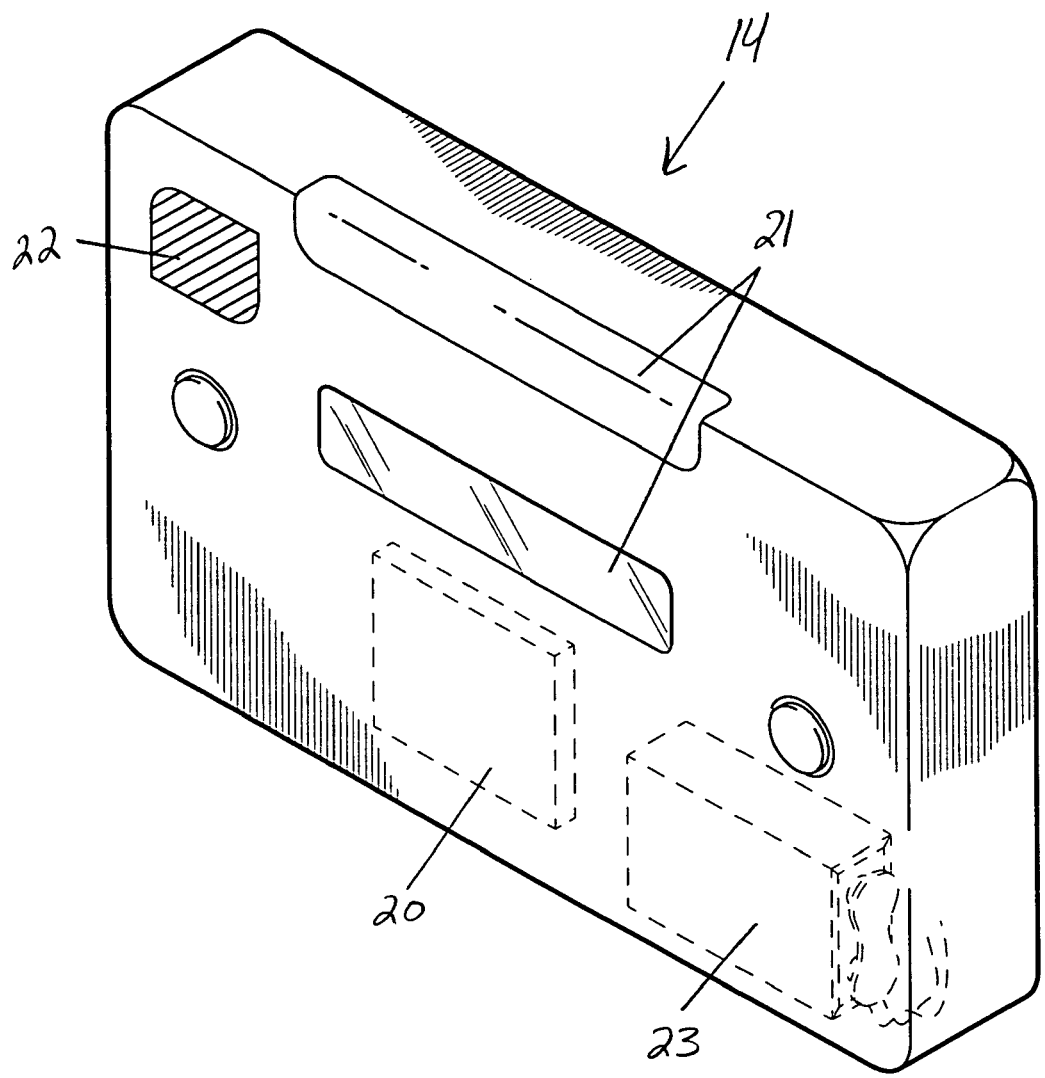
FIG. 3 is a front perspective view of a receiving wireless communications device of the present invention depicting generic data output structure including a message display screen, a light-emitting screen, and an audio speaker as well as a Bluetooth chip, and a power source.

Referring now to the drawings with more specificity, the preferred embodiment or specification of the present invention generally concerns a system and method for notifying a package recipient of package delivery. In other words, the present invention discloses in first part, a package delivery notification system and, in second part, a package delivery notification method. It is contemplated that the package delivery notification system of the present invention may be said to preferably comprise, in combination, a package 10 as illustrated and referenced in FIGS. 6(a) and 7; a package recipient 11 as illustrated and referenced in FIGS. 5(b) and 7; a package carrier 12 as illustrated and referenced in FIGS. 5(a) and 6(a); a first or carrier-borne wireless communications device 13 as illustrated and referenced in FIGS. 2, 5(a), and 6(a); a second or recipient-bearing or recipient-holding wireless communications device 14 as illustrated and referenced in FIGS. 1, 3, 5(a), 5(b), 5(c), 6(b), and 7; and a recipient setting 15 such as a house, shop, place of business, or similar other premises as generally depicted and referenced in FIGS. 1, 5(a), 5(b), 6(b), and 7.

As is common or typical with package delivery schemes, the package 10 is preferably cooperatively associated with certain package-associable data 16 as may be born by the package 10 and as generally depicted and referenced in FIGS. 6(*a*) and 7. The package-associable data 16 may well function to direct the package carrier 12 to the recipient setting 15, and in this regard, may comprise certain recipient-based information such as the package recipient's name, address, and telephone number. Further, the package associable data 16 may preferably comprise certain carrier-based information, such as the carrier's name, carrier's company, delivery time, delivery date, carrier telephone number, carrier's company telephone number, package tracking numbers(s), and other miscellaneous package information, such as package weight, place of origin, brief descriptors of package contents, etc. Central to the practice of the system of methodology of the present invention, is the process whereby the package carrier 12 delivers or brings both the package 10 and the first wireless communications device 13 to within a delivery distance relative to the recipient setting 15 as generally and diagrammatically depicted in FIG. 5(*a*), 6(*a*), and 6(*b*). Notably, the recipient setting 15 is preferably a fixed location such as the recipient's home, place of business, or similar other destination readily ascertainable by the carrier 12 as heretofore stated.

It is contemplated that the first wireless communications device 13 may preferably comprise certain data-inputting means as generically represented by an input pad 17; certain data-transmitting means, as represented by the combination of input pad 17 and a Bluetooth chip 19 (circuitry not specifically illustrated or referenced); and a power source 18 generally depicted as an electrochemical battery (such as a 9-volt battery) as referenced in FIG. 2. The second wireless communications device 14 may be preferably installed in a recipient setting and comprises certain data-receiving means as represented by a Bluetooth chip 20 and power source 23 as referenced in FIG. 3; data-outputting means as generically depicted as certain recipient-signaling means such as visual output means 21 or and certain auditory output means 22 as referenced in FIG. 3. Notably, the recipient-signaling means may thus be preferably defined by as a select stimuli provider, the select stimuli being selected from the group consisting of visual stimuli and auditory stimuli for stimulating or signaling to the package recipient that a message has been received, which message may preferably take the form of a package delivery message.

Figure 7:
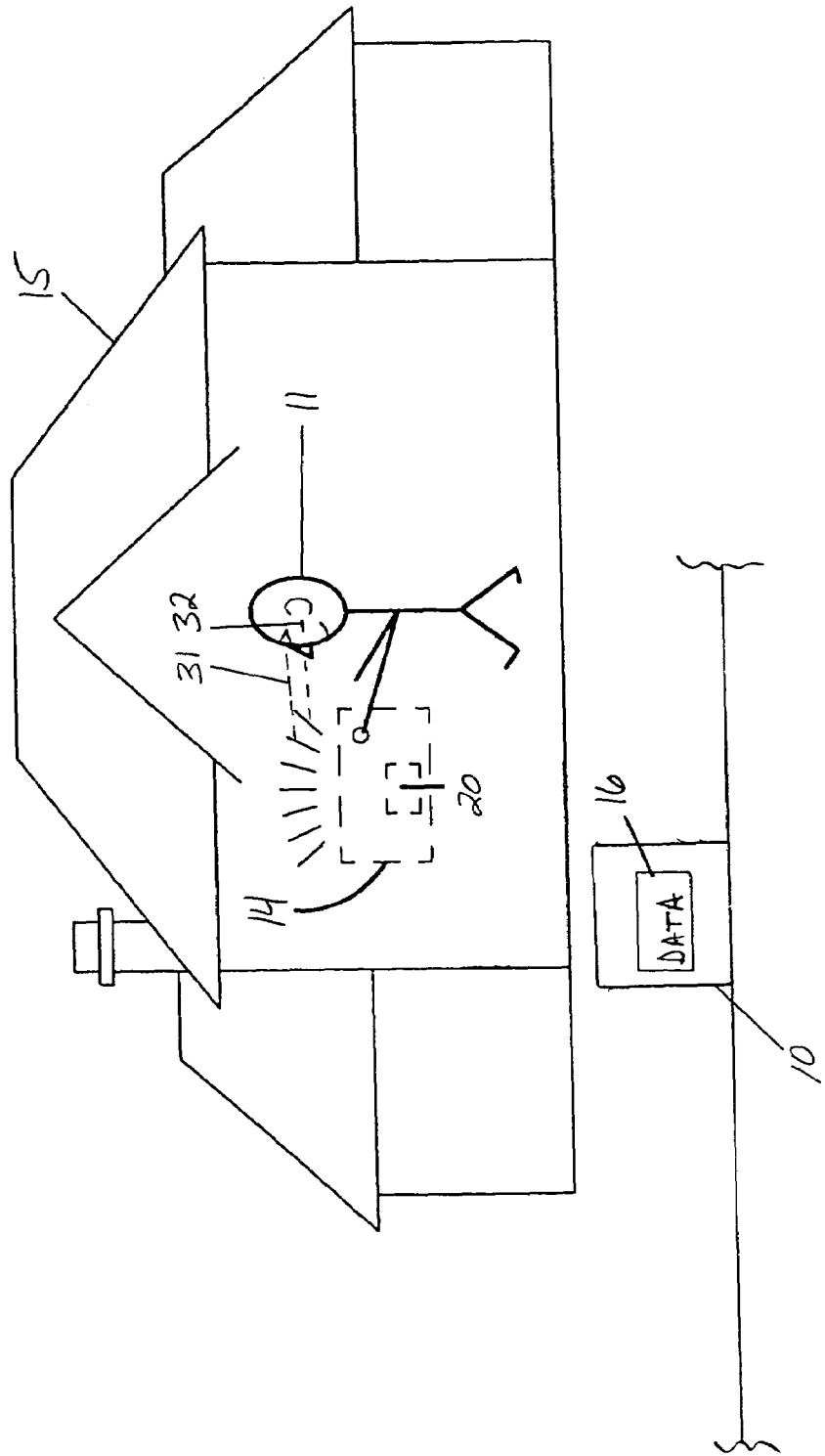
FIG. 7 is an enlarged fragmentary depiction of the package recipient being notified of a package's arrival via the second wireless communications device showing the package atop a package support surface in adjacency to the recipient setting.

The heretofore-mentioned delivery distance enables communication (as generically depicted and referenced at 24 in FIGS. 5(*a*)-6(*b*)) intermediate the first and second wireless communications devices 12 and 13. In this regard, it should be understood or noted that the package carrier 12 transmits a package-delivery message to the second communications device 14 via the data-inputting means and data-transmitting means of the first wireless communications device 13. The data-receiving means of the second wireless communications device 14 receives the package-delivery message, and the data-outputting means (either signaling means or message-displaying means) provide the package recipient 13 with the package delivery message. Thus, the package delivery notification system may well function to notify the package recipient 13 of package proximity or package arrival as generally depicted in FIG. 7.

FIGS. 4(*a*)-4(*c*) collectively depict movement of the first wireless communications device 13 (represented by a small inner circle) into closer proximity to the second wireless communications device 14 (also represented by a small inner circle). In this regard, it will be understood from an inspection of the noted figures, for example, that the first wireless communications device 13 may well function to transmit radio frequency-enabled transmissions (recall that device 13 preferably comprises Bluetooth chip type circuitry) up to an effective range 25, broadcasted in all directions (depicted in two dimensions in FIGS. 4(*a*)-4(*c*)) radially from the device 13. Further, it should be understood from an inspection of the noted figures that the second wireless communications device 14 may well function to receive radio frequency-enabled transmissions (recall that device 14 preferably also comprises Bluetooth chip type circuitry) With an effective range 26, extending in all directions (depicted in two dimensions in FIGS. 4(*a*)-4(*c*)) radially from the device 14.

Preferably, it is contemplated that the first and second wireless communications devices 13 and 14 cooperate to enable effective wireless communication via radio frequency transmission(s). It should be noted that the maximum range is preferably defined by about a 10 meter (10 m) radius at a radio frequency of about 2.4 GigaHertz (2.4 GHz) at 1 milliwatt (1 mW) of power enabled (or deliverable) by each of the first and second power sources. In this last regard, it is noted that Bluetooth technology is driven by radio waves located in the frequency band of 2.4 GHz (2400 to 2483.5 MHz) of the radio frequency spectrum. In this band, Bluetooth typically transmits voice and data at flows lower than 1 megabit per second.

A so-called Bluetooth network (otherwise commonly known as Piconet) can allow the interconnection of eight Bluetooth-enabled devices in a radius of 10 meters, provided certain parameters are followed. This network can be fixed or stationary versus provisional (i.e. a mobile or transitory network). Typically, in a Piconet network, the "master" device seeks the devices in its entourage by broadcasting or emitting requests. The "slave" device(s) answer(s) with its or their identification number(s). By default, Piconets transmit up to 10 meters or about 32 feet. However, the transmission radius may be increased to about 100 meters by increasing the power output of 100 mW (milliwatts), as opposed to the 1 mW of default Bluetooth.

It may thus be said that the delivery distance 28 as contemplated by the package delivery notification system of the present invention may be preferably defined by a personal area network 29 as generally depicted in FIG. 4(*c*). In this regard, it is further noted that Bluetooth is not designed to compete with wireless local area networks (LAN's). Even its close-range throughput of 1 Mbps does not compare with the 11 Mbps that the emerging standard for wireless LAN offers. Instead, Bluetooth seems positionable for use within so-called personal area networks (PAN's). As earlier noted, a personal area network is a network used for communication among devices (such as telephones and personal digital assistants) that are close in proximity to the user. The effective reach or radius of a PAN is typically a few meters.

Since Bluetooth is a relatively inexpensive technology (between $5 and $20 per chip), it can easily be placed in many devices, and is thus to be preferred for incorporation in the present system and methodology as a means to keep manufacturing and consumer costs minimized. In addition to the relatively inexpensive nature of the technology, Bluetooth offers other benefits over the prior art such as not requiring an access point, unlike more traditional radio operator networks. Further, Bluetooth is well suited for mobile devices, since it can join a local Piconet quickly, as soon as the two devices are in a sufficient perimeter. Moreover, unlike infrared networks (like two Palm computers beaming each other), Bluetooth does not require the users to align Bluetooth-bearing objects in order to enable communication therebetween.

In terms of addressing certain methodology taught by the present disclosures, it is contemplated that the present invention may effectively provide or teach certain methods for notifying a package recipient 11 of package proximity or package arrival. A first method, for example, may be said to comprise certain steps, including installing a first wireless communications device (such as device 14) in a recipient setting 15 as generally and comparatively depicted in FIGS. 1, 5(a), 5(b), 6(b), and 7. Further, as generally depicted in FIG. 6(a), a package carrier 12, as perhaps aided by a package delivery truck or bed 30 thereof, simultaneously carries both a second wireless communications device (such as device 13) and a package 10. The package carrier 12, by carrying the package 10, may thereafter deliver the package 10 or finally reduce the package distance intermediate the recipient setting 15 and the package 10 as figuratively depicted in FIGS. 4(a) through 4(c).

Figure 4A:
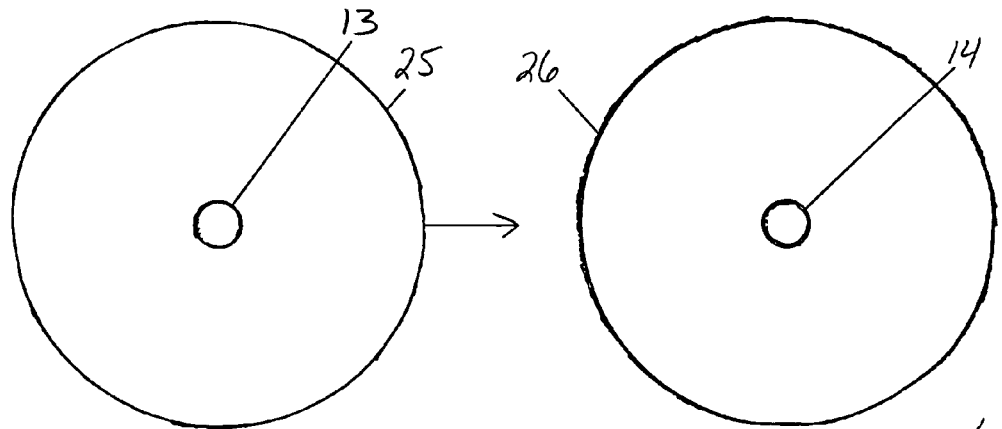
FIG. 4(a) is a diagrammatic depiction of a mobile wireless data-transmitting device and range thereof moving toward a stationary wireless data-receiving device and range thereof.
Figure 4B:
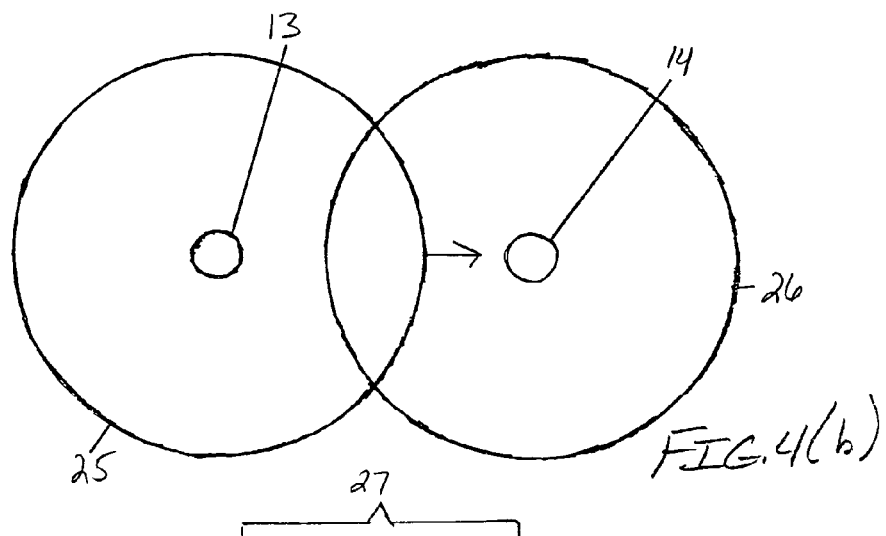
FIG. 4(b) is a diagrammatic depiction of a mobile wireless data-transmitting device and range thereof overlapping a stationary wireless data-receiving range extending outwardly from a stationary wireless data-receiving device.
Figure 4C:
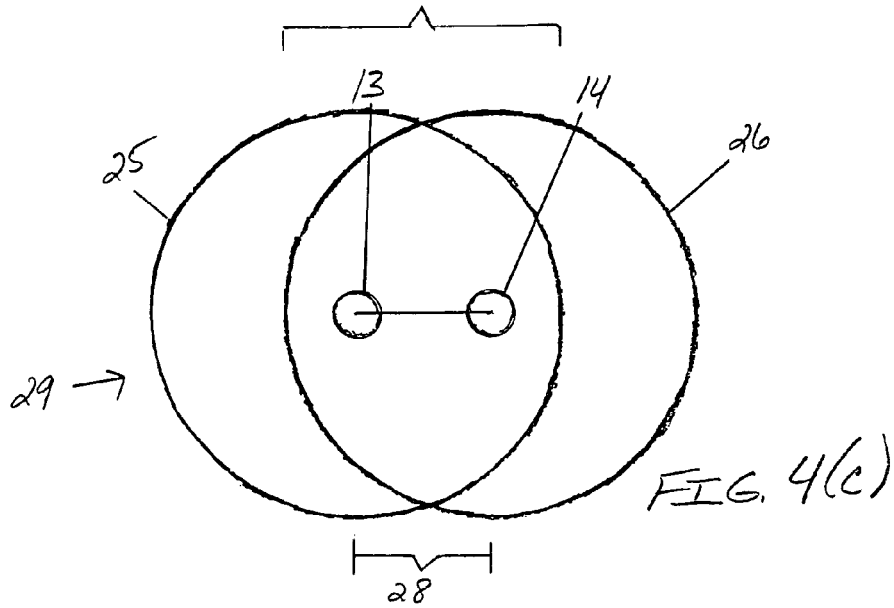
FIG. 4(c) is a diagrammatic depiction of a temporarily stationary wireless data-transmitting device and range thereof effecting a personal area network with a stationary wireless data-receiving range extending outwardly from a stationary wireless data-receiving device.

It will be noted from an inspection of the FIG. 4 series, that FIG. 4(a) depicts a relatively large distance intermediate the package 10 (simultaneously carried with the device 13 by package carrier 12 diagrammatically depicted as within the small inner left-hand circle) and the stationary second wireless communications device 14. FIG. 4(b), however, depicts an intermediate distance between the package 10 and the stationary second wireless communications device 14. Further, FIG. 4(b) depicts overlapping ranges 25 and 26; however, package 10 (within the small inner left-hand circle) is at a distance where the devices 13 and 14 are not yet within range of one another. FIG. 4(c) depicts a device distance 28 wherein the two devices 13 and 14 are able to communicate with one another (in other words, the carrier device functions to send data and the recipient setting device functions to receive and display data).

In this last regard, it is contemplated that the methodology of the present invention may further preferably comprise the step of sending package-associable data such as data 16 to the first wireless communications device (such as device 14) from the second wireless communications device (such as device 13) within the personal area network 29. The data-receiving means of the second wireless communications device may thus receive the sent package-associable data, which triggers the recipient-signaling means to signal a package recipient 11 located at the recipient setting 15. The signaled package recipient 11 may then perceive (either visually as at 31 or auditorily as at 32 in FIG. 7) the package-delivery message.

More particularly, the recipient setting-based wireless communications device (such as device 14) is cooperatively associated or associable with a personal area network (such as network 29), and preferably comprises certain data-receiving means, certain recipient-signaling means, certain message-displaying means, and a first power source. The personal area network here noted may be preferably defined by a range distance. The carrier-based wireless communications device (such as device 13) preferably comprises certain data-transmitting means and a second power source, and thereby is communicable with the first wireless communications device within the range distance.

The finally reduced distance (as generally depicted at 28 in FIGS. 4(c) and 6(a) to 6(b)) intermediate the recipient setting 15 and the package 10 is preferably lesser in magnitude than the range distance as depicted at 27 in FIG. 4(c) thereby enabling data transmission intermediate the first and second wireless communications devices 13 and 14 within the personal area network 29. The package-associable data, being sent to the first wireless communications device from the second wireless communications device within the personal area network, may preferably comprise a package-delivery message for the package recipient 11, who may, after the message is received (triggering a recipient signal), perceive the package-delivery message. The package-deliver message may thus effectively notify the package recipient of package proximity or package arrival.

While the above descriptions contain much specificity, this specificity should not be construed as limitations on the scope of the invention, but rather as an exemplification of the invention. For example, the invention may be said to essentially teach or disclose a package delivery notification system and method whereby the location of a first wireless communications device (such as device 14) is fixed such as may be achieved by installing the device in a home, dwelling or place of business. The first wireless communications device is preferably cooperatively associated with a first piconet, and comprises certain data-receiving means and certain message-displaying means. The first piconet extends radially outward from the first wireless communications device.

A second wireless communications device (such as device 13) and a package 10 may then be carried toward the first piconet, the second wireless communications device being cooperatively associated with a second piconet, and comprising data-transmitting means. Similar to the first piconet, the second piconet extends radially outward from the second wireless communications device. The first and second piconets may then be overlapped (as diagrammatically depicted in FIG. 4(b)), thereby enabling communication intermediate the first and second wireless communications devices (as in FIG. 4(c)) when the first and second piconets embrace the first and second wireless communications devices 13 and 14. The embraced first and second wireless communications devices 13 and 14 are preferably and cooperatively associated with a personal area network 29.

The package carrier 12 may then send package-associable data 16 to the first wireless communications device (such as device 14) from the second wireless communications device (such as device 13) within the personal area network 29, which package-associable data 16 may preferably comprise a package-delivery message. The data-receiving means may thus receive the sent package-associable data 16 and message or notify a package recipient 11 located within the personal area network 29 with the package-delivery message via the message-outputting means. The package-recipient 11, having perceived the package-delivery message, is thereby notified of package proximity or package arrival.

Stated another way, it is contemplated that the present invention provides a method for notifying a package recipient 11 of a package's arrival, the method comprising the steps of reducing the distance intermediate a package recipient 11n and a package 10 paired or cooperatively associated with certain wireless data-transmitting means, the data-transmitting means being cooperatively associated with an effective transmittal range extending outwardly from the package 10 (as paired with the data-transmitting means as on, or in adjacency to, the person of the package carrier 11). In other words, the distance intermediate the package 10 and the data-transmitting means may be preferably held substantially constant (and relatively close) while the distance intermediate the package recipient 11 and the package 10 is reduced.

After, or while, reducing the distance intermediate the package 10 and the package recipient 11 (for example, by delivery the package 10 to the package recipient 11), the effective transmittal range is overlapped with a signal-receiving range, the signal-receiving range being cooperatively associated with certain data-receiving means. Thereby, the data-transmitting means and the data-receiving means may effectively cooperate for effecting communication of package-associable data therebetween. The package-associable data may then be sent and received via the data-transmitting means and the data-receiving means, whereafter the data-receiving means may function to message or display the package delivery system for notifying the package recipient of package proximity or package arrival.

It is further noted that the power source 23 of the second wireless communications device 14 may be alternatively defined by 120 Volt Alternating Current (AC current) as typified by a common household wall outlet provided the internal circuitry of the second wireless communications device 14 is engineered to accommodate such a power source. It is believed that electrical circuitry of this type is well within the ordinary skill of those skilled in the art and no further descriptions thereof are necessary here.

Accordingly, although the invention has been described by reference to a number of preferred structures cooperatively associated with one another to effect a certain systematic package notification and/or methodology, it is not intended that the novel system, methodology, or combination thereof be limited thereby, but that modifications thereof are intended to be included as falling within the broad scope and spirit of the foregoing disclosure, the following claims and drawings.

I claim:

1. A method for notifying a package recipient of package proximity, the method comprising the steps of:
   installing a first wireless communications device in a recipient setting, the first wireless communications device being cooperatively associated with a personal area network and comprising data-receiving means, recipient-signaling means, message-displaying means, and a first power source, the personal area network being defined by a range distance;
   simultaneously carrying a second wireless communications device and a package by a package carrier, the second wireless communications device comprising data-transmitting means and a second power source, the first and second wireless communications devices being communicable within the range distance;
   finally reducing the package distance intermediate the recipient setting and the package via the package carrier, the finally reduced distance being lesser in magnitude than the range distance as ascertained by the package carrier thereby enabling data transmission intermediate the first and second wireless communications devices;
   inputting package-associable data into the second wireless communications device by the package carrier upon package delivery;
   sending the package-associable data to the first wireless communications device from the second wireless communications device, the package-associable data comprising a package-delivery message;
   receiving the sent package-associable data via the data-receiving means;
   signaling a package recipient located at the recipient setting via the recipient-signaling means; and
   perceiving the package-delivery message by the package recipient, the perceived package-delivery message notifying the package recipient of package delivery by the package carrier.

2. The method of claim 1 wherein the recipient-signaling means provide select stimuli, the select stimuli being selected from the group consisting of visual stimuli and auditory stimuli.

3. The method of claim 1 wherein the recipient setting is a fixed location, the step of finally reducing the package distance intermediate the recipient setting and the package being performed by a mobile carrier.

4. The method of claim 1 wherein the first and second wireless communications devices communicate via radio frequency transmission.

5. The method of claim 4 wherein the personal area network has a maximum range, the maximum range being defined by about a 10 meter radius at a radio frequency of about 2.4 GHz at about 1 mW of power enabled by each of the first and second power sources.

6. A method for notifying a package recipient of package proximity, the method comprising the steps of:
   fixing the location of a first wireless communications device, the first wireless communications device being cooperatively associated with a first piconet and comprising data-receiving means and message-displaying means, the first piconet extending radially outward from the first wireless communications device;
   carrying a second wireless communications device and a package by a package carrier toward the first piconet, the second wireless communications device being cooperatively associated with a second piconet and comprising data-transmitting means, the second piconet extending radially outward from the second wireless communications device;
   ascertaining when the first and second piconets overlap by the package delivery person, the first and second wireless communications devices being communicable when the first and second piconets embrace the first and second wireless communications devices, the embraced first and second wireless communications devices being cooperatively associated with a personal area network;
   inputting package-associable data into the second wireless communications device by the package carrier upon package delivery;
   sendine the package-associable data to the first wireless communications device from the second wireless communications device within the personal area network, the package-associable data comprising a package-delivery message;
   receiving the package-delivery message via the data-receiving means; and
   messaging a package recipient located with the package-delivery message via the message-outputting means, the perceived package-delivery message notifying the package recipient of package delivery by the package carrier.

7. The method of claim 6 comprising installing the first wireless communications device in the recipient setting.

8. The method of claim 6 comprising signaling the package recipient after receiving the sent package-delivery message via recipient-signaling means, the recipient-signaling means being cooperatively associated with the first wireless communications device.

9. The method of claim 8 wherein the recipient-signaling means provide select stimuli, the select stimuli being selected from the group consisting of visual stimuli and auditory stimuli.

10. A method for notifying a package recipient of package proximity, the method comprising the steps of:
    reducing the distance intermediate a package recipient and a package by a package carrier, the package being cooperatively associated with wireless data-transmitting means, the wireless data-transmitting means being cooperatively associated with a transmittal range, the transmittal range extending outwardly from the package and the package carrier;
    overlapping the transmittal range with a signal-receiving range as ascertained by the package carrier, the signal-receiving range being cooperatively associated with data-receiving means, the data-transmitting means and the data-receiving means being cooperable for effecting corrirriunication of package-associable data therebetween;

inputtinig package-associable data into the data-transmitting means by the package carrier upon package delivery;

sending package-associable data via the data-transmitting means to the data-receiving means;

receiving tbe package-associable data via the data-receiving means; and messaging the package-associable data via the data-receiving means, the package-associable data for notifying a package recipient of package delivery by the package carrier.

11. The method of claim 10 comprising signaling the package recipient after receiving the package-associable data via recipient-signaling means, the recipient-signaling means being cooperatively associated with the first wireless communications device.

12. The method of claim 11 wherein the recipient-signaling means provide select stimuli, the select stimuli being selected from the group consisting of visual stimuli and auditory stimuli.

13. The method of claim 10 compiising fixing the location of the data-receiving means before reducing the distance intermediate the package recipient and the package.

14. The method of claim 13 wherein the distance intermediate the package and the data-transmitting means is held substantially constant while the distance intermediate the package recipient and the package is reduced.

15. The method of claim 14 wherein the package and data-transmitting means are simultaneously carried by a mobile carrier while the distance intermediate the package recipient and the package is reduced.

16. The method of claim 15 wherein the data-transmitting means are defined by a personal digital assistant.

17. A package delivery notification system, the package delivery notification system comprising, in combination:

a package, first and second wireless communications devices, and a recipient setting, the package being cooperatively associated with package-associable data and carried by a package carrier, the package-associable data for directing the package carrier to the recipient setting, the package carrier bringing the package and the first wireless communications device to within a delivery distance relative to the recipient setting as ascertained by the nackage carrier, the first wireless communications device comprising data-inputting means, data-transmitting means, and a first power source, the second wireless communications device being located at the recipient setting and comprising data-receiving means, data-outputting means, and a second power source, the delivery distance enabling communication intermediate the first and second wireless communications devices, the package carrier transmitting a package-delivery message to the second communications device via the data-inputting means and data-transmitting means, the data-receiving means receiving the package-delivery message, the data-outputting means providing a package recipient at the recipient setting with the package delivery message, the package delivery notification system thus for notifying the package recipient of package delivery by the package carrier.

18. The package delivery notification system of claim 17 wherein the delivery distance is defined by a personal area network.

19. The package delivery notification system of claim 18 wherein the first and second wireless communications devices cooperate via radio frequency transmission.

20. The package delivery notification system of claim 19 wherein the personal area netwodc has a maximum range, the maximum range being defined by about a 10 meter radius at a radio frequency of about 2.4 GHz at 1 mW of power enabled by the first and second power sources.

* * * * *